US008780178B2

(12) United States Patent
Koh et al.

(10) Patent No.: US 8,780,178 B2
(45) Date of Patent: Jul. 15, 2014

(54) DEVICE AND METHOD FOR DISPLAYING THREE-DIMENSIONAL IMAGES USING HEAD TRACKING

(75) Inventors: Eun-Jin Koh, Daejeon (KR); Jong-Ho Won, Daejeon (KR); Jun-Seok Park, Daejeon (KR); Jeun-Woo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 235 days.

(21) Appl. No.: 12/970,569

(22) Filed: Dec. 16, 2010

(65) Prior Publication Data

US 2011/0149043 A1 Jun. 23, 2011

(30) Foreign Application Priority Data

Dec. 18, 2009 (KR) ........................ 10-2009-0127115

(51) Int. Cl.
*H04N 13/02* (2006.01)
*H04N 13/04* (2006.01)
*G09G 3/14* (2006.01)

(52) U.S. Cl.
USPC .................................. 348/46; 348/51; 345/46

(58) Field of Classification Search
USPC ........................................ 348/46, 51; 345/46
See application file for complete search history.

(56) References Cited

U.S. PATENT DOCUMENTS

| | | | | |
|---|---|---|---|---|
| 6,503,195 B1 * | 1/2003 | Keller et al. | ................. | 600/160 |
| 2003/0043146 A1 * | 3/2003 | Kitamura et al. | ............. | 345/419 |
| 2007/0252832 A1 * | 11/2007 | Ratai | ............................ | 345/427 |
| 2008/0145089 A1 * | 6/2008 | Takahashi | ...................... | 399/74 |
| 2009/0256904 A1 * | 10/2009 | Krill et al. | ...................... | 348/47 |

FOREIGN PATENT DOCUMENTS

| | | |
|---|---|---|
| EP | 0899690 A2 | 3/1999 |
| EP | 1296173 A1 | 3/2003 |
| JP | 11-88913 | 3/1999 |
| KR | 10-2007-0078225 | 7/2007 |
| KR | 10-2009-0027056 | 3/2009 |
| KR | 10-2009-0034430 | 4/2009 |
| WO | 02/03124 A1 | 1/2002 |

* cited by examiner

*Primary Examiner* — Dave Czekaj
*Assistant Examiner* — Tsion B Owens
(74) *Attorney, Agent, or Firm* — Staas & Halsey LLP

(57) ABSTRACT

Disclosed herein are a device and method for displaying 3D images. The device includes an image processing unit for calculating the location of a user relative to a reference point and outputting a 3D image which is obtained by performing image processing on 3D content sent by a server based on the calculated location of the user, the image processing corresponding to a viewpoint of the user, and a display unit for displaying the 3D image output by the image processing unit to the user. The method includes calculating the location of a user relative to a reference point, performing image processing on 3D content sent by a server from a viewpoint of the user based on the calculated location of the user, and outputting a 3D image which is obtained by the image processing, and displaying the 3D image output by the image processing unit to the user.

15 Claims, 5 Drawing Sheets

50
20
MARKER
30
CONTENTS SERVER
OB
10
160
DISPLAY UNIT
170
COMMUNICATION UNIT
180
LIGHT EMISSION /RECEPTION UNIT
DS
120
130
DS
140
150
110
CAPTURE UNIT
PI
LOCATION CALCULATION UNIT
(x2,y2,z2)
IMAGE CONTROL UNIT
BH
ACTION PROCESSING UNIT
(x1,y1,z1)
OB 51
40
20
MARKER
160
DISPLAY UNIT
DS
FIRST COMMUNICATION UNIT
173
30
CONTENTS SERVER
OB
11
110
CAPTURE UNIT
120
PI
LOCATION CALCULATION UNIT
130'
(x2, y2, z2)
IMAGE CONTROL UNIT
140
BH
ACTION PROCESSING UNIT
150
(x3, y3, z3)
OB
DS
171
SECOND COMMUNICATION UNIT
LIGHT EMISSION /RECEPTION UNIT
180

DEVICE AND METHOD FOR DISPLAYING THREE-DIMENSIONAL IMAGES USING HEAD TRACKING

CROSS REFERENCE TO RELATED APPLICATION

This application claims the benefit of Korean Patent Application No. 10-2009-0127115, filed on Dec. 18, 2009, which is hereby incorporated by reference in its entirety into this application.

BACKGROUND OF THE INVENTION

1. Technical Field

The present invention relates generally to three-dimensional (3D) image technology, and, more particularly, to a device and method for displaying 3D images using head tracking which are capable of tracking the locations of the heads of users and displaying 3D images from the viewpoints of the users.

2. Description of the Related Art

Recently, 3D image processing technology has been utilized in various fields, including the fields of education, training, medical services, movies, and computer games. 3D images have the advantages of providing a feeling of a sense of presence, a feeling of reality, and a natural feeling, compared to two-dimensional (2D) images.

Currently, there is a large amount of research being done into the implementation of 3D image displays. The implementation of 3D image display devices requires a variety of types of technology, including input technology, processing technology, transmission technology, display technology, software technology. In particular, research into display technology, digital image processing technology, computer graphic technology, and a human vision system is essential for the implementation of the 3D image display devices.

Conventional 3D image displays include glass-type display devices and glass-free display devices.

The glass-type 3D display devices use a color separation method of viewing images via colored glasses using different wavelengths of light, a polarizing glass method using the property of the directions in which light vibrates being different, or a liquid crystal shutter method of separating right and left images from each other using a time division technique and viewing them.

The glass-free 3D display devices use a method of separating the right and left images from each other and then providing 3D images to a user without requiring glasses.

However, the conventional 3D display devices are problematic in that it is difficult to display different 3D images from the viewpoints of a plurality of users when they are sharing a single 3D image.

SUMMARY OF THE INVENTION

Accordingly, the present invention has been made keeping in mind the above problems occurring in the prior art, and an object of the present invention is to provide a device and method for displaying 3D images which are capable of displaying different 3D images from the respective viewpoints of a plurality of users.

In order to accomplish the above object, the present invention provides a device for displaying 3D images, including an image processing unit for calculating the location of a user relative to a reference point, and outputting a 3D image which is obtained by performing image processing on 3D content, sent by a server, based on the calculated location of the user, the image processing corresponding to a viewpoint of the user; and a display unit for displaying the 3D image, output by the image processing unit, to the user.

In order to accomplish the above object, the present invention provides a method of displaying 3D images, including calculating the location of a user relative to a reference point;

performing image processing on 3D content, sent by a server, based on the calculated location of the user, the image processing corresponding to a viewpoint of the user, and outputting a 3D image which is obtained by the image processing; and displaying the 3D image, output by the image processing unit, to the user.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
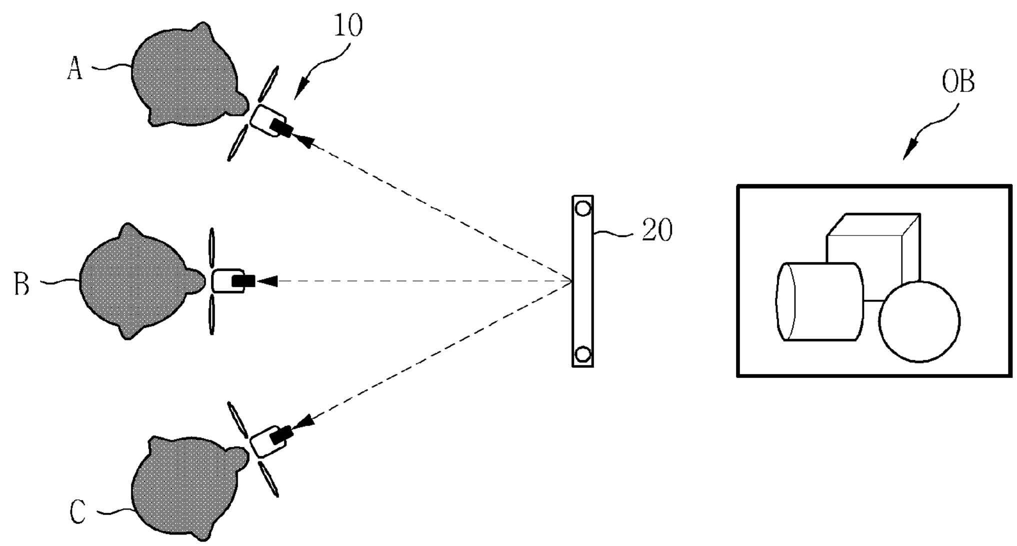
FIG. 1 is a diagram showing an image system including 3D image display devices according to an embodiment of the present invention.

Reference now should be made to the drawings, in which the same reference numerals are used throughout the different drawings to designate the same or similar components.

Figure 2A:
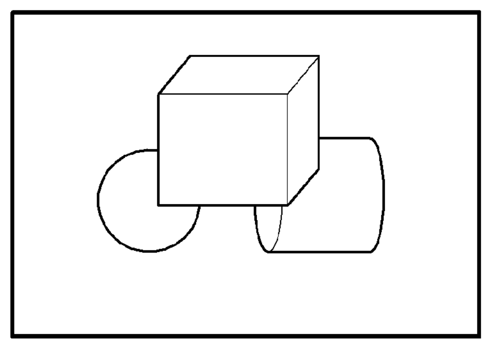
FIGS. 2A to 2C are diagrams showing 3D images displayed on respective 3D image display devices of the plurality of users of FIG. 1.
Figure 2B:
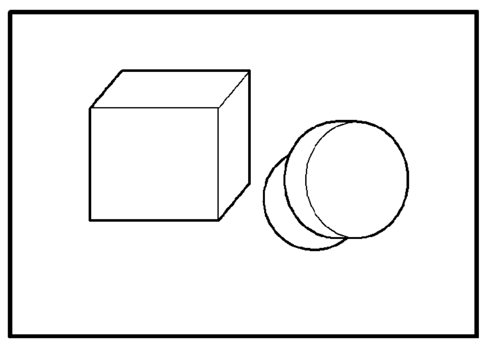
Figure 2C:
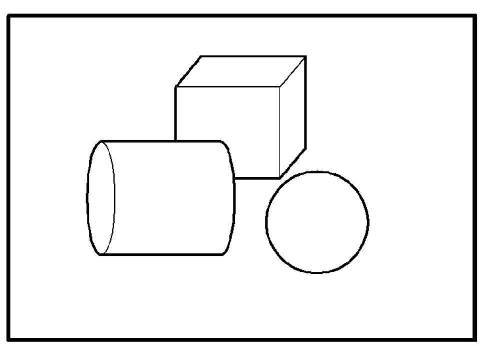
Figure 3:
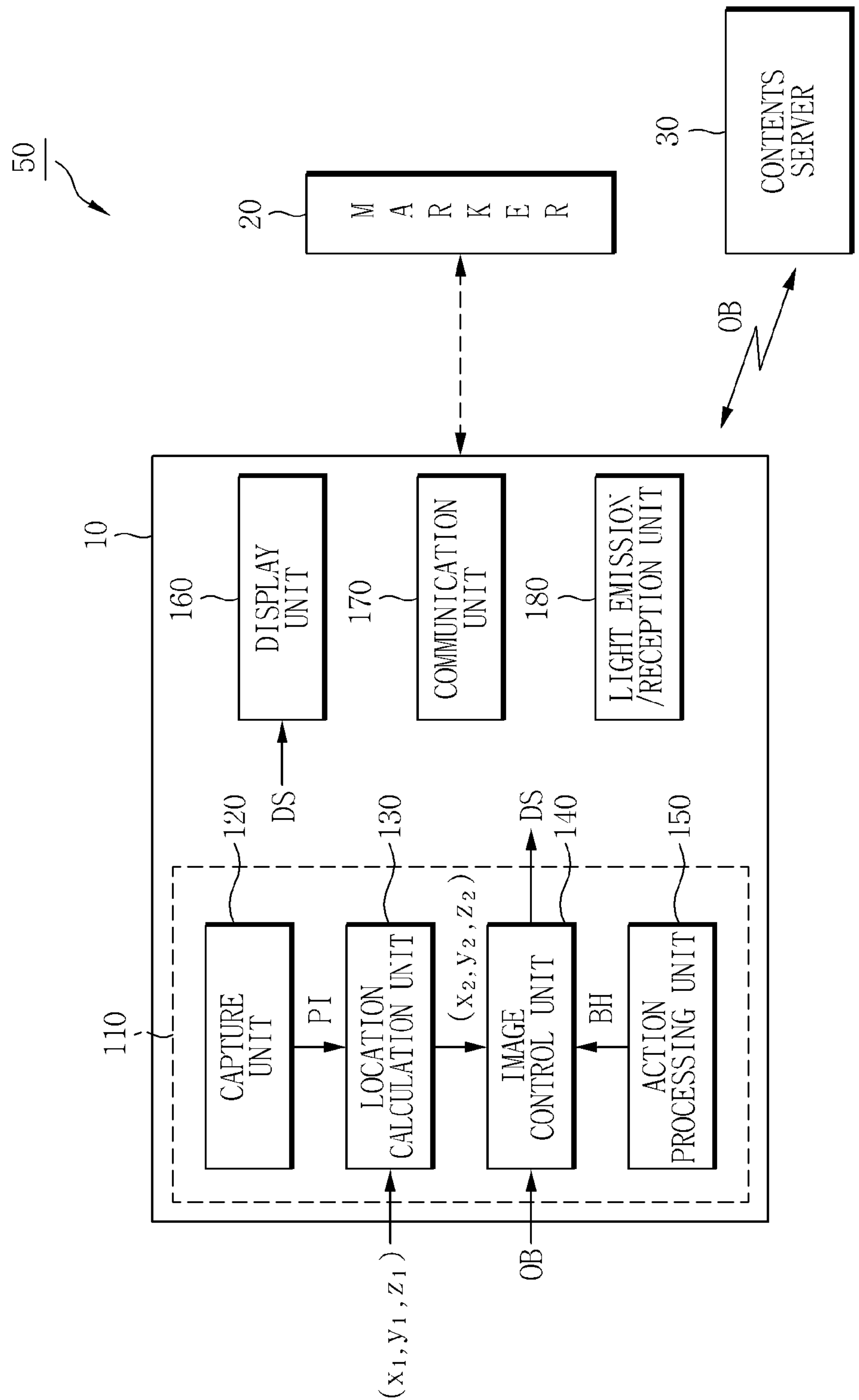
FIG. 3 is a block diagram showing the image system of FIG. 1.
Figure 4:
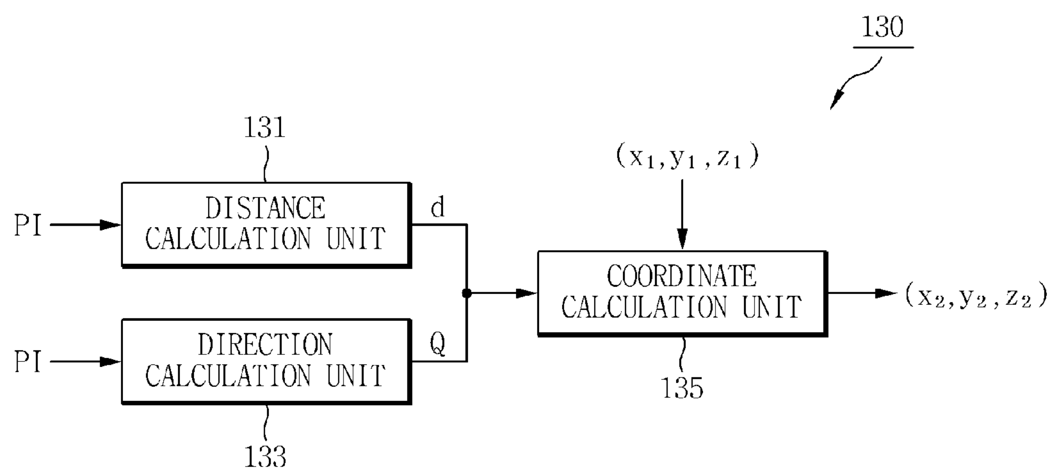
FIG. 4 is a block diagram showing the location calculation unit of FIG. 3.

FIG. 1 is a diagram showing an image system including 3D image display devices according to an embodiment of the present invention, FIGS. 2A to 2C are diagrams showing 3D images displayed on respective 3D image display devices of the plurality of users of FIG. 1, FIG. 3 is a block diagram showing the image system of FIG. 1, and FIG. 4 is a block diagram showing the location calculation unit of FIG. 3.

Referring to FIGS. 1 and 3, an image system 50 according to an embodiment of the present invention may include 3D image display devices 10 respectively worn by a plurality of users A, B and C, a marker 20, and a contents server 30.

The 3D image display devices 10 respectively worn by the plurality of users A, B, and C may receive objects in virtual space, for example, 3D content OB in virtual space, from the contents server 30, convert them into 3D images DS, and display them to the plurality of users A, B, and C.

Here, the plurality of users A, B, and C may wear the 3D image display devices 10 and then gaze at a reference point, for example, the marker 20. The 3D image display devices 10 may display respective 3D images DS to the plurality of users A, B, and C from the respective viewpoints of the plurality of users A, B, and C, that is, from different viewpoints at the locations of the plurality of users A, B, and C.

In other words, the 3D image display device 10 worn by user A may display the 3D content OB, sent by the contents server 30, to user A based on the location of user A relative to the marker 20 in the form of a 3D image DS, such as that shown in FIG. 2A.

Furthermore, the 3D image display device 10 worn by user B may display the 3D content OB, sent by the contents server 30, to user B based on the location of user B relative to the marker 20 in the form of a 3D image DS, such as that shown in FIG. 2B.

Furthermore, the 3D image display device 10 worn by the user C may display the 3D content OB, sent by the contents server 30, to the user C based on the location of user C relative to the marker 20, in the form of a 3D image DS, such as that shown in FIG. 2C.

Although in the present embodiment, the 3D images DS are displayed from different viewpoints based on the locations of the plurality of users A, B, and C, the present invention is not limited thereto. For example, it will be apparent that the present invention can be applied to the case where user A wears the 3D image display device 10 and moves to a different location to (the location of user B or the location of user C).

The marker 20 may be spaced apart from each of the plurality of users A, B, and C by a predetermined distance.

The contents server 30 may set virtual space at the location of the marker 20, and send 3D content OB to the 3D image display devices 10 worn by the plurality of users A, B, C, respectively, in the set virtual space.

The 3D image display device 10 worn by user A of the plurality of users A, B, and C and a 3D image display method using the 3D image display device 10 will be described in detail below.

Although in the present embodiment, only the 3D image display device 10 worn by user A will be described, the 3D image display device 10 shown in FIG. 1 and worn by user B or the user C also have the same configuration as the 3D image display device 10 worn by user A and also can perform the same 3D image display operation as the 3D image display device 10 worn by user A.

Referring to FIGS. 1 and 3, user A may wear the 3D image display device 10 and then gaze at a reference point, that is, the marker 20, while the 3D image display device 10 performs image processing on the 3D content OB, received from the contents server 30, based on the location of user A, for example, the spatial location of user A around the marker 20, and display the processed 3D image DS to user A.

For this purpose, the 3D image display device 10 worn by user A may include an image processing unit 110, a display unit 160, and a communication unit 170.

The image processing unit 110 may perform image processing on the 3D content OB, sent by the contents server 30, from the viewpoint of user A based on the location of user A, and output the processed 3D content, that is, a 3D image DS. The image processing corresponds to the viewpoint of user A.

Furthermore, the image processing unit 110 may incorporate a predetermined action input by user A, that is, a user action BH, into the 3D image DS and then output the 3D image DS.

Here, user Action BH may refer to a predetermined action which is input into the 3D image DS in such a way that user A moves his or her hand, arm and leg while viewing the 3D image DS.

In other words, while a 3D image DS, such as that shown in FIG. 2A, is being displayed to user A, user A may perform the action of moving a cubic object using his or her arm (or hand).

The image processing unit 110 may incorporate the action of user A, that is, a user action BH, into the displayed 3D image DS and output the updated 3D image DS.

Here, the 3D image display device 10 may further include an action detection device (not shown) which is worn by user A and can detect the actions of user A.

Furthermore, as shown in FIG. 1, when the plurality of users A, B, and C shares a single marker 20, that is, the same virtual space, information about user Action BH input by user A may be sent to the 3D image display devices 10, worn by the other users, that is, users B and C, through the communication unit 170 of the 3D image display device 10 worn by user A.

Accordingly, each of the 3D image display devices 10 worn by user B and user C can incorporate the sent user action BH into a corresponding displayed 3D image DS and then output a resulting image.

The image processing unit 110 may include a capture unit 120, a location calculation unit 130, an image control unit 140, and an action processing unit 150.

The capture unit 120 may capture the marker 20 at the location of user A, and output the captured marker image PI of the marker 20.

The capture unit 120 may be worn by user A on the region near his or her head, for example, a region of user A near the forehead, and output different marker images PI depending on the action of user A, such as moving or moving the head.

The capture unit 120 may be implemented using an image sensor device, such as a CCD or a CMOS image sensor.

The location calculation unit 130 may receive marker coordinates (x1, y1, z1) from the contents server 30 (or, the marker 20), and calculate the location coordinates (x2, y2, z2) of user A, for example, the coordinates of the spatial location of user A away from the marker 20 using the marker image PI output by the capture unit 120 and the marker coordinates (x1, y1, z1).

Referring to FIGS. 3 and 4, the location calculation unit 130 may include a distance calculation unit 131, a direction calculation unit 133, and a coordinate calculation unit 135.

The distance calculation unit 131 may calculate the distance d between the marker 20 and the capture unit 120, that is, user A, based on the captured marker image PI, and output the calculated distance d.

The direction calculation unit 133 may calculate the angle θ between the marker 20 and the capture unit 120, that is, user A, based on the captured marker image PI, and output the calculated angle θ. Here, the direction calculation unit 133 calculates the angle θ which is formed by an imaginary line extending in a direction normal to the marker 20 and the capture unit 120, and output the calculated angle θ.

The coordinate calculation unit 135 may calculate the location coordinates (x2, y2, z2) of user A using the distance d calculated based on the coordinates (x1, y1, z1) of the marker 20 and the calculated angle θ.

The location coordinates (x2, y2, z2) output by the coordinate calculation unit 135 may be the spatial coordinates of user A relative to the marker 20, that is, spatial location coordinates (x2, y2, z2) in virtual space set by the contents server 30 around the marker 20.

Referring to FIGS. 1 and 3 again, the image control unit 140 may perform image processing on the 3D content OB, sent by the contents server 30 through the communication unit 170, based on the location coordinates (x2, y2, z2) of user A output by the location calculation unit 130, and output a 3D image DS which is obtained by the image processing.

The image control unit 140 may convert the sent 3D content OB into a 3D image DS from the viewpoint of user A.

The action processing unit 150 may send user Action, input by user A, to the image control unit 140, and the image control unit 140 may update the 3D image DS based on user Action BH and output the updated 3D image DS.

The display unit 160 may display the 3D image DS, output by the image control unit 140, to user A.

The display unit 160 may be a glass-type display device which is worn by user A on his or her eyes, or a head-mounted display device which is worn by user A on his or her head.

The communication unit 170 may receive 3D content OB from the contents server 30 or marker coordinates (x1, y1, z1) while communicating with the contents server 30 or marker 20.

Furthermore, when the plurality of users A, B, and C wears the 3D image display devices 10, respectively, the communication unit 170 may enable a 3D image DS or a user action BH to be shared while communicating with the 3D image display devices 10 of the plurality of users.

This means that the plurality of users A, B, and C in the same virtual space wear the 3D image display devices 10, and can collaborate with each other using predetermined actions while viewing 3D images DS from different viewpoints.

A light emission/reception unit 180 may output light onto the marker 20, or receive light output by the marker 20.

For example, the marker 20 may be implemented using a light emission device such as a Light Emitting Diode (LED) Here, the light emission/reception unit 180 of the 3D image display device 10 may receive light output by the marker 20.

Furthermore, the marker 20 may be implemented using a reflective film Here, the light emission/reception unit 180 of the 3D image display device 10 may output light onto the marker 20, and receive light reflected from the marker 20.

The marker 20 may be spaced from user A by a predetermined distance, and the contents server 30 may set virtual space at the location of the marker 20 and send 3D content OB to the 3D image display device 10 of user A in the set virtual space.

Figure 5:
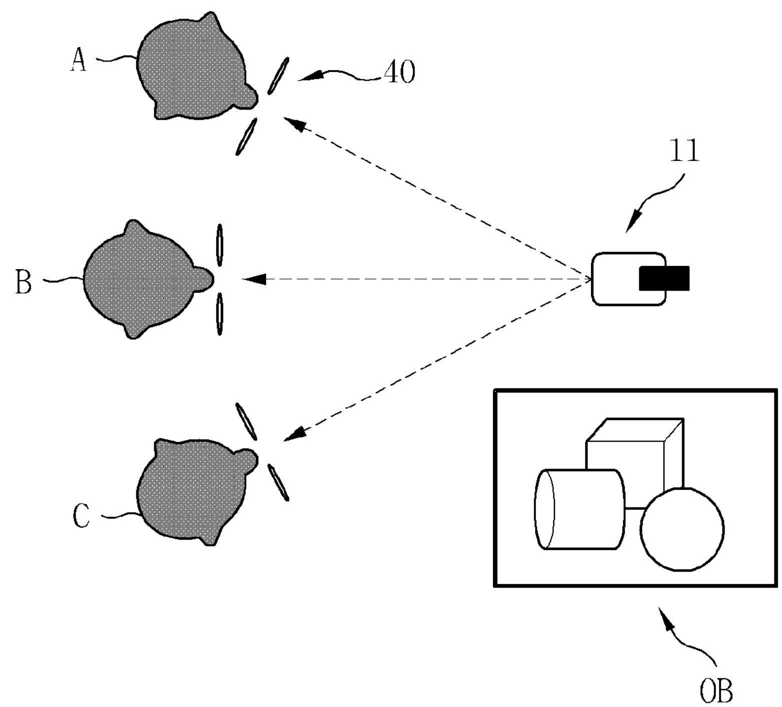
FIG. 5 is a diagram showing an image system including 3D image display devices according to another embodiment of the present invention.
Figure 6:
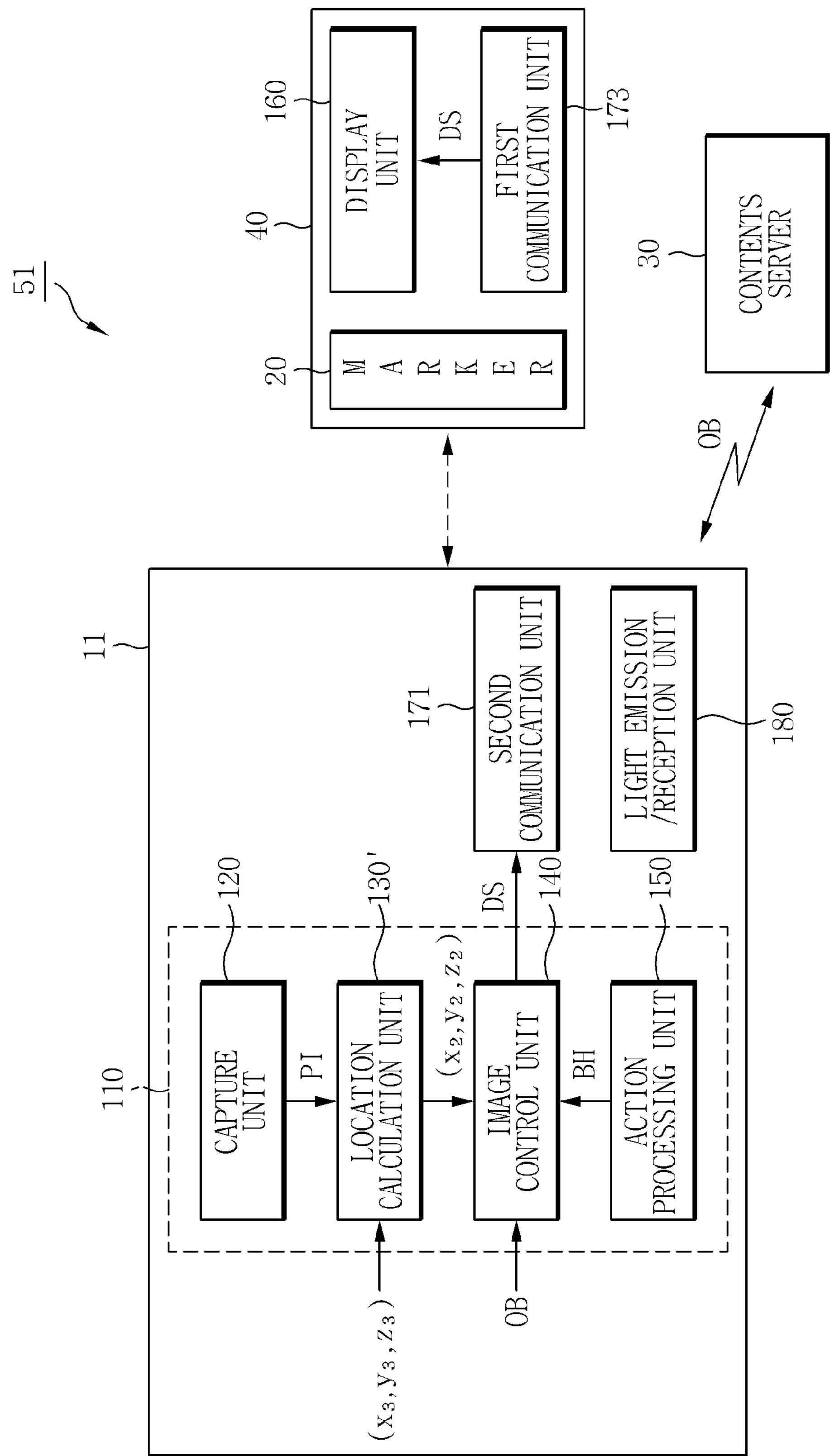
FIG. 6 is a block diagram showing the image system of FIG. 5.

FIG. 5 is a diagram showing an image system including a 3D image display device according to another embodiment of the present invention, and FIG. 6 is a block diagram showing the image system of FIG. 5.

Referring to FIGS. 5 and 6, the image system including a 3D image display device according to the other embodiment of the present invention will now be described.

In the present embodiment, for ease of description, components having the same functionalities as the image system 50 described in conjunction with FIGS. 1 to 4 are denoted by the same reference numerals or characters, and detailed descriptions thereof will be omitted here.

The image system 51 shown in FIGS. 5 and 6 has the same configuration as the image system 50 shown in FIGS. 1 to 4 except for the following components.

The image system 51 shown in FIGS. 5 and 6 may include first devices 40 configured to be worn by a plurality of users A, B, and C, respectively, and a second device 11 and a contents server 30 configured to send a 3D image DS to the first devices 40.

That is, the image system 51 according to the present embodiment is configured such that the 3D image display devices 10 shown in FIGS. 1 to 4 and worn by the plurality of users A, B, and C are implemented using the single second device 11 and the plurality of users A, B, and C may respectively wear the first devices 40 each including a marker 20 and a display unit 160. In other words, the second devices 11 may function as a reference point For ease of description, the first device 40 worn by user A of the plurality of users A, B, and C and 3D image display operation will now be described.

User A may wear the first device 40. The first device 40 may be worn by user A on the region near his or her head.

The first device 40 may include a marker 20, a display unit 160, and a first communication unit 173.

The marker 20 may be attached to a region of user A near his or her head. The marker 20 may be implemented using a light emission device or a reflective film.

Furthermore, the marker 20 may be replaced with a bodily region such as the eye, nose or mouth of user A.

The display unit 160 may display a 3D image DS, output by the second device 11, to user A.

The display unit 160 may be implemented using a glass-type display device or a head-mounted display device.

The first communication unit 173 may receive a 3D image DS from the second device 11 and output the 3D image to the display unit 160 while communicating with the second device 11.

Meanwhile, although not shown in the drawings, the first device 40 may further include an action detection device (not shown) capable of detecting the actions of user A.

The second device 11 may be spaced apart from user A by a predetermined distance. The second device 11 may calculate the spatial location of user A relative to the marker 20 of the first device 40 worn by user A.

The second device 11 may create a 3D image DS from the viewpoint of user A based on the calculated location of user A, and output the created 3D image DS. The 3D image DS may be sent to the first device 40 worn by user A.

The second device 11 may include an image processing unit 110, a first communication unit 173, and a light emission/reception unit 180.

The image processing unit 110 may perform image processing on the 3D content OB sent by the contents server 30 from the viewpoint of user A based on the location of user A, and output the image-processed 3D content, that is, a 3D image DS.

Furthermore, the image processing unit 110 may incorporate a predetermined action input by user A, that is, a user action BH, to the 3D image DS, and output the 3D image DS.

The image processing unit 110 may include a capture unit 120, a location calculation unit 130', an image control unit 140, and an action processing unit 150.

The location calculation unit 130' may include a distance calculation unit 131, a direction calculation unit 133, and a coordinate calculation unit 135.

The capture unit 120 may capture the marker 20 of the first device 40, and output the marker image PI of the captured marker 20.

The location calculation unit 130' may receive the coordinates (x3, y3, z3) of the capture unit 120 from the contents server 30, and calculate the location coordinates (x2, y2, z2) of user A, for example, the coordinates of the spatial location of user A (or, marker 20) relative to the capture unit 120, using the marker image PI output by the capture unit 120 and the coordinates (x3, y3, z3) of the capture unit 120.

The distance calculation unit 131 of the location calculation unit 130' may calculate the distance d between the marker 20, that is, user A, and the capture unit 120 based on the captured marker image PI, and output the calculated distance.

The direction calculation unit 133 of the location calculation unit 130' may calculate the angle θ between the marker 20 and the capture unit 120 based on the captured marker image PI, and output the calculated angle θ.

Here, the direction calculation unit 133 may calculate an angle θ which is formed between an imaginary line extending in a direction normal to the capture unit 120 and the marker 20, and output the angle θ.

The coordinate calculation unit 135 may calculate the location coordinates (x2, y2, z2) of user A using the distance d calculated based on the coordinates (x3, y3, z3) of the capture unit and the calculated angle θ.

The location coordinates (x2, y2, z2) output by the coordinate calculation unit 135 may be the spatial coordinates of user A, that is, spatial location coordinates (x2, y2, z2) in virtual space set by the contents server 30 around the capture unit 120, relative to the capture unit 120.

The image control unit 140 may perform image processing on the 3D content OB sent by the contents server 30 based on the location coordinates (x2, y2, z2) of user A output by the location calculation unit 130, and output the image-processed 3D image DS.

The image control unit 140 may convert the sent 3D content OB into a 3D image DS from the viewpoint of user A. Accordingly, user A may view a 3D image DS, such as that shown in FIG. 2A, using the display unit 160 of the first device 40.

The action processing unit 150 may send a user action BH input by user A to the image control unit 140, and the image control unit 140 may update a 3D image DS according to user Action BH and output the updated 3D image DS.

The second communication unit 171 may receive 3D content OB from the contents server 30 or the coordinates (x3, y3, z3) of the capture unit 120 while communicating with the contents server 30.

Furthermore, the second communication unit 171 may send the 3D image DS output from the viewpoint of user A to the first communication unit 173 while communicating with the first communication unit 173 of the first device 40 worn by user A.

Furthermore, when the plurality of users A, B, and C wears the first devices 40, respectively, the second communication unit 171 may send 3D images DS output from the viewpoints of the plurality of users A, B, and C while communicating with the first communication units 173 of the first devices 40 of the plurality of users A, B, and C.

The light emission/reception unit 180 may output light to the marker 20 of the first device 40 or receive light output by the marker 20.

The contents server 30 may set virtual space at the location of the second device 11, that is, the capture unit 120, and send 3D content OB to the second device 11 in the set virtual space.

The image system, including 3D image display devices which are worn by a plurality of users located in the same physical space, which display different 3D images from the viewpoints of the plurality of users, and which enable the plurality of users to collaborate with each other using the 3D images, has been described.

However, when a plurality of users is located in different physical spaces, the image system according to the present invention can display different 3D images from the viewpoints of the plurality of users and enables the plurality of users to collaborate with each other using the 3D images.

For example, the image system 50 according to the present invention shown in FIGS. 1 and 3, when a plurality of users A, B, and C is located in different physical spaces, the marker 20 shared by the plurality of users A, B, and C may be located in the physical spaces allocated to the plurality of users A, B, and C, respectively, and the coordinates (x1, y1, z1) of the marker 20 may be set the same.

As a result, even when a plurality of users A, B, and C is located in different physical spaces, respectively, the coordinates (x1, y1, z1) of markers are the same in the physical spaces, so that the effect of seeming to be present in the same virtual space can be achieved.

Furthermore, in the image system 51 according to the present invention shown in FIGS. 5 and 6, when a plurality of users A, B, and C is located in different physical spaces, the second device 11 shared by the plurality of users A, B, and C may be located in physical spaces allocated to the plurality of users A, B, and C, respectively, and the coordinates (x3, y3, z3) of the capture units 120 of the second devices 11 may be set the same.

As a result, even when the plurality of users A, B, and C is located in different physical spaces, respectively, coordinates (x3, y3, z3) of the capture units 120 are the same, so that the effect of seeming to be present in the same virtual space can be achieved.

As described above, the 3D image display device has the advantage of calculating the spatial locations of a plurality of users and providing different 3D images from respective viewpoints of the plurality of users.

Furthermore, the 3D image display device has the advantage of enabling a plurality of users to collaborate with each other while viewing 3D images.

Furthermore, the 3D image display device has the advantage of, even when a plurality of users are located in different physical spaces, enabling them to be located in the same virtual space and enabling them to collaborate with each other while viewing 3D images from different viewpoints.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A device for displaying three-dimensional (3D) images, comprising:

an image processing unit for calculating a location of each of a plurality of users in different physical locations from each other relative to a reference point marker marking a virtual location of a scene, and outputting a 3D image which is obtained by performing image processing on 3D content, sent by a server, based on the calculated location of each of the users and the marker virtual location, the image processing corresponding to a viewpoint of the users viewing the scene; and a display unit for displaying the 3D image, which is output by the image processing unit, for the users.

2. The device as set forth in claim 1, wherein:

the reference point is spaced apart from the users; and the image processing unit comprises:

a capture unit, for each individual user, for capturing the reference point at a location of a head of the individual user, and outputting an image of the reference point; and a location calculation unit for calculating the location of the individual user based on the image of the reference point output by the capture unit.

3. The device as set forth in claim 2, wherein:

the location calculation unit comprises:

a distance calculation unit for calculating a distance between the capture unit and the reference point based on the image of the reference point; and a direction calculation unit for calculating an angle between the capture unit and the reference point based on the reference point image, and the location calculation unit calculates the location of the user based on coordinates of the reference point, the calculated distance, and the calculated angle.

4. The device as set forth in claim 1, wherein: the reference point is attached to the user: and the image processing unit comprises: a capture unit for capturing the reference point at a location spaced apart from the user, and outputting an image of the reference point; and a location calculation unit for calculating the location of the user based on the image of the reference point output by the capture unit.

5. The device as set forth in claim 4, wherein: the location calculation unit comprises: a distance calculation unit for calculating a distance between the capture unit and the reference point based on the image of the reference point; and a direction calculation unit for calculating an angle between the capture unit and the reference point based on the reference point image; and the location calculation unit calculates the location of the user based on coordinates of the capture unit, the calculated distance, and the calculated angle.

6. The device as set forth in claim 1, further comprising an action processing unit for updating the 3D image based on an action input by the one of the users.

7. The device as set forth in claim 6, wherein:

the display unit comprises a plurality of display units configured to be worn by the plurality of users, respectively; and displaying the 3D image, updated based on an action input by one of the plurality of users, to the plurality of display units worn by the plurality of users, respectively.

8. The device as set forth in claim 1, wherein the reference point includes a light emission device, and the image processing unit includes a light reception device for receiving light output by the light emission device.

9. The device as set forth in claim 1, wherein the reference point includes a reflective film, and the image processing unit includes a light emission device for outputting light to the reflective film and a light reception device for receiving light reflected from the reflective film.

10. A method of displaying 3D images, comprising:

calculating locations of users relative to a reference point marker marking a virtual location of a scene where each of the users are in different physical locations from each other relative to the reference point marker;

performing image processing on 3D content, sent by a server, based on the calculated locations of the users and the reference point marker, the image processing corresponding to a viewpoint of the users, and outputting a 3D image which is obtained by the image processing; and displaying the 3D image, output by the image processing unit, to the users.

11. The method as set forth in claim 10, wherein the calculating a location of users comprises:

capturing the reference point at a location of a head of an individual user, and outputting an image of the reference point; and calculating the location of the individual user based on the image of the reference point.

12. The method as set forth in claim 11, wherein the calculating a location of the individual users comprises:

calculating a distance between the individual user and the reference point based on the image of the reference point;

calculating an angle between the individual user and the reference point based on the reference point image; and calculating the location of the individual user based on coordinates of the reference point, the calculated distance, and the calculated angle.

13. The method as set forth in claim 10, wherein the calculating a location of a user comprises: capturing the reference point attached to the user using a capture unit spaced apart from the user, and outputting an image of the reference point: and calculating the location of the user based on the image of the reference point.

14. The method as set forth in claim 13, wherein the calculating a location of a user comprises: calculating a distance between the capture unit and the user based on the image of the reference point: and calculating an angle between the capture unit and the user based on the reference point image: and calculating the location of the user based on coordinates of the capture unit, the calculated distance, and the calculated angle.

15. The method as set forth in claim 10, wherein the 3D image is displayed to the users;

further comprising:

receiving an action from one of the users;

updating the 3D image by incorporating the action into the 3D image; and displaying the updated 3D image to the users.

* * * * *